United States Patent
Gady et al.

(10) Patent No.: US 9,631,538 B2
(45) Date of Patent: Apr. 25, 2017

(54) IDENTIFYING AMMONIA SLIP CONDITIONS IN A SELECTIVE CATALYTIC REDUCTION APPLICATION

(75) Inventors: Kevin Andrew Gady, Ypsilanti, MI (US); Amin Abboud, Livonia, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2324 days.

(21) Appl. No.: 12/578,899

(22) Filed: Oct. 14, 2009

(65) Prior Publication Data

US 2011/0005202 A1    Jan. 13, 2011

Related U.S. Application Data

(60) Provisional application No. 61/224,698, filed on Jul. 10, 2009.

(51) Int. Cl.

| | |
|---|---|
| *F01N 3/00* | (2006.01) |
| *F01N 3/10* | (2006.01) |
| *F01N 3/20* | (2006.01) |
| *F01N 9/00* | (2006.01) |
| *F01N 11/00* | (2006.01) |

(52) U.S. Cl.
CPC .............. *F01N 3/208* (2013.01); *F01N 9/00* (2013.01); *F01N 11/00* (2013.01); *F01N 2560/026* (2013.01); *F01N 2560/06* (2013.01); *F01N 2900/0404* (2013.01); *F01N 2900/1616* (2013.01); *Y02T 10/24* (2013.01); *Y02T 10/47* (2013.01)

(58) Field of Classification Search
CPC .............. F01N 11/00; F01N 2560/026; F01N 2560/06; F01N 2900/1616; F01N 3/208; F01N 9/00; Y02T 10/24; Y02T 10/47
USPC ................. 60/274, 276, 286, 295, 301, 303
See application file for complete search history.

(56) References Cited

U.S. PATENT DOCUMENTS

| | | | | |
|---|---|---|---|---|
| 5,201,802 | A * | 4/1993 | Hirota et al. .................... | 60/276 |
| 5,369,956 | A * | 12/1994 | Daudel et al. ................... | 60/276 |
| 5,845,487 | A * | 12/1998 | Fraenkle et al. ................ | 60/276 |
| 6,546,720 | B2 * | 4/2003 | van Nieuwstadt .............. | 60/276 |
| 2009/0266059 | A1 | 10/2009 | Kesse et al. | |

FOREIGN PATENT DOCUMENTS

DE    102010026206 A1    2/2011

\* cited by examiner

*Primary Examiner* — Jesse Bogue
*Assistant Examiner* — Diem Tran

(57) ABSTRACT

A system includes a filtering module that filters a first signal that indicates an amount of nitrogen oxides (NOx) in exhaust gas upstream from a catalyst, and that filters a second signal that indicates amounts of NOx and ammonia (NH3) in exhaust gas downstream from the catalyst. A slip determination module determines whether NH3 is present in exhaust gas downstream from the catalyst based on a frequency response of the first and second signals.

20 Claims, 7 Drawing Sheets

IDENTIFYING AMMONIA SLIP CONDITIONS IN A SELECTIVE CATALYTIC REDUCTION APPLICATION

CROSS-REFERENCE TO RELATED APPLICATIONS

This application claims the benefit of U.S. Provisional Application No. 61/224,698, filed on Jul. 10, 2009. The disclosure of the above application is incorporated herein by reference in its entirety.

FIELD

The present disclosure relates to emission control systems, and more particularly to systems and methods for determining whether ammonia slip occurs in a selective catalytic reduction system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Engines emit exhaust gas that includes carbon monoxide (CO), hydrocarbons (HC), and nitrogen oxides (NOx). An exhaust treatment system reduces the levels of CO, HC, and NOx in the exhaust gas. The exhaust treatment system may include an oxidation catalyst (OC) (e.g., a diesel OC), a particulate filter (PF) (e.g., a diesel PF), and a selective catalytic reduction (SCR) system. The OC oxidizes CO and HC to form carbon dioxide and water. The PF removes particulate matter from the exhaust gas. The SCR system reduces NOx.

The SCR system injects a reducing agent (e.g., urea) into the exhaust gas upstream from an SCR catalyst. The reducing agent forms ammonia that reacts with NOx in the SCR catalyst. The reaction of ammonia and NOx in the SCR catalyst reduces the NOx and results in the emission of diatomic nitrogen and water. When excess reducing agent is injected into the exhaust gas, the excess reducing agent may form excess ammonia that passes through the SCR catalyst without reacting.

SUMMARY

A system includes a filtering module that filters a first signal that indicates an amount of nitrogen oxides (NOx) in exhaust gas upstream from a catalyst, and that filters a second signal that indicates amounts of NOx and ammonia (NH3) in exhaust gas downstream from the catalyst. A slip determination module determines whether NH3 is present in exhaust gas downstream from the catalyst based on a frequency response of the first and second signals.

In other features, the filtering module passes first frequency components of the signals that indicate only NOx and attenuates second and third frequency components of the signals that indicate NOx and NH3. The first frequency components include frequencies that are greater than a frequency threshold and the second and third frequency components include frequencies that are less than or equal to the frequency threshold. A conversion ratio module determines a NOx conversion ratio of the catalyst based on the first frequency components.

In other features, the slip determination module determines an estimated magnitude of the second signal based on a magnitude of the first signal and the NOx conversion ratio. The slip determination module determines NH3 is present when a difference between the estimated magnitude and a magnitude of the second signal is greater than a threshold.

A system includes an injector control module that adjusts a flow rate of a dosing agent, wherein the adjusted flow rate controls an amount of ammonia (NH3) in exhaust gas upstream from a catalyst. A comparison module that compares first and second samples of a signal based on the adjusted flow rate, wherein the signal indicates an amount of nitrogen oxides (NOx) and an amount of NH3 in exhaust gas downstream from the catalyst. A slip determination module determines whether NH3 is present in the exhaust gas downstream from the catalyst based on the adjusted flow rate and the comparison.

In other features, a sampling module samples the first sample when the injector control module adjusts the flow rate and that samples the second sample at a predetermined time after the first sample. The slip determination module determines NH3 is present when the adjusted flow rate decreases the amount of NH3 and the second sample is less than the first sample. The slip determination module determines NH3 is present when the adjusted flow rate increases the amount of NH3 and the second sample is greater than the first sample.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
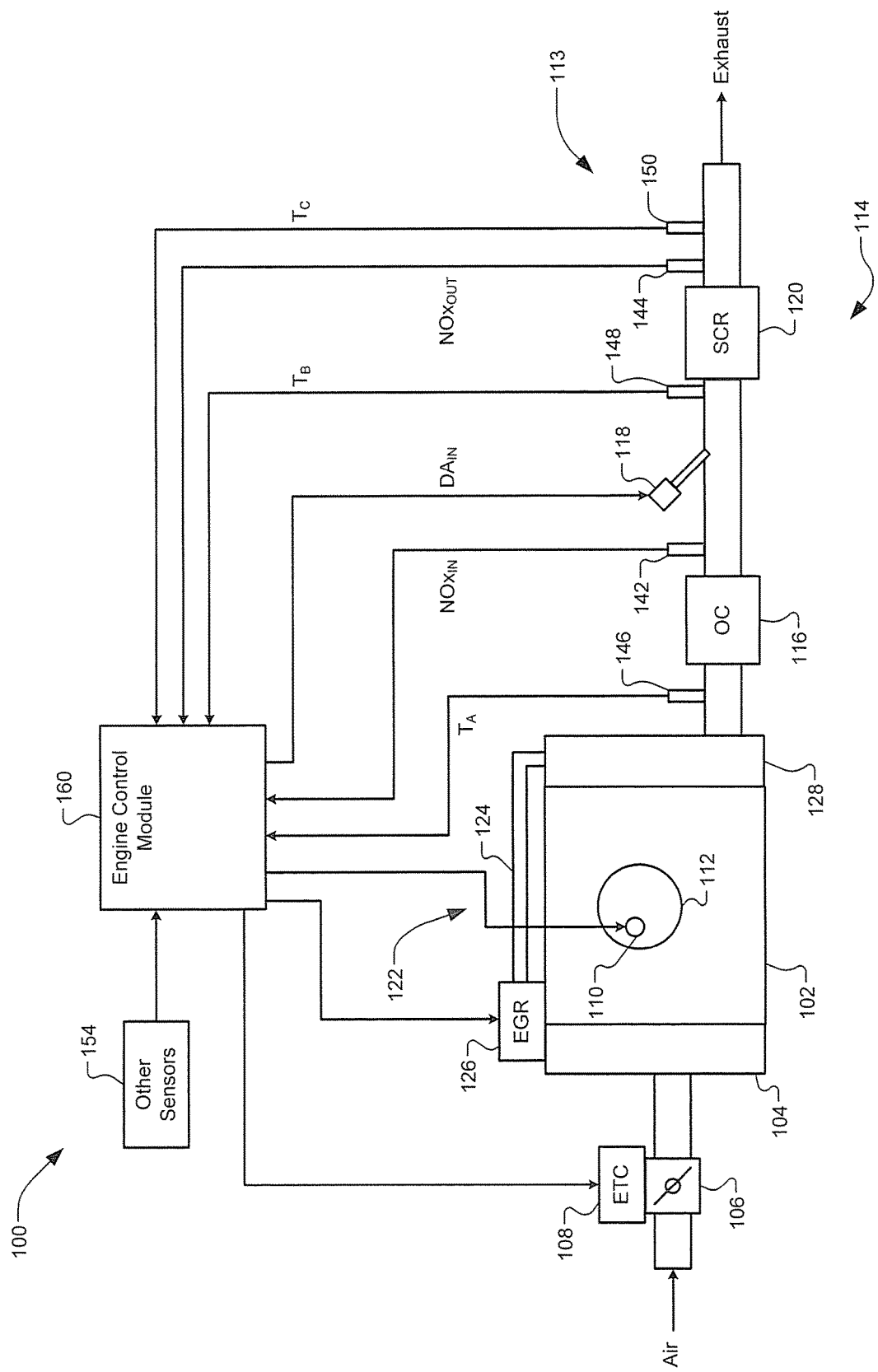
FIG. 1 is a functional block diagram of an engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, and/or a combinational logic circuit.

A selective catalytic reduction (SCR) system includes a reducing agent injector that injects a reducing agent into exhaust gas to form ammonia ($NH_3$). $NH_3$ may be released from the SCR system, for example, when the reducing agent injector injects excess reducing agent or when the temperature of the SCR system increases. Release of $NH_3$ from the SCR system may be referred to hereinafter as "$NH_3$ slip."

A slip detection system according to the present disclosure determines when $NH_3$ slip is occurring. The slip detection system may sample signals from nitrogen oxide (NOx) sensors that indicate an amount of nitrogen oxides upstream and downstream from the SCR catalyst. The NOx sensor downstream from the SCR catalyst may also indicate an amount of $NH_3$ released from the SCR system when $NH_3$ slip is occurring.

In one embodiment, the slip detection system may filter the NOx signals based on frequencies of the NOx signals. The slip detection system may determine a NOx conversion ratio using the filtered NOx signals. The slip detection system determines an estimated magnitude of the downstream NOx signal based on the NOx conversion ratio and the magnitude of the unfiltered upstream NOx signal. The slip detection system compares the estimated magnitude with the magnitude of the unfiltered downstream NOx signal to determine whether $NH_3$ slip is occurring.

In another embodiment, the slip detection system may adjust an amount of dosing agent injected upstream from the SCR catalyst. The slip detection system may determine a change in the magnitude of the downstream NOx signal after adjusting the amount of dosing agent. The slip determination module determines whether $NH_3$ slip is occurring based on the adjustment of the amount of dosing agent and the change in the downstream NOx signal.

Referring now to FIG. 1, a functional block diagram of an engine system 100 is presented. Air is drawn into an engine 102 through an intake manifold 104. A throttle valve 106 controls airflow into the engine 102. An electronic throttle controller (ETC) 108 may control the throttle valve 106 and, therefore, the airflow into the engine 102. The air mixes with fuel from a fuel injector 110 to form an air/fuel mixture. The air/fuel mixture is combusted within one or more cylinders of the engine 102, such as cylinder 112. Combustion of the air/fuel mixture generates torque.

Exhaust gas resulting from the combustion of the air/fuel mixture is expelled from the cylinders to an exhaust system 113. The exhaust gas may include particulate matter (PM) and gases. The exhaust gas includes nitrogen oxides (NOx), such as nitrogen oxide (NO) and nitrogen dioxide ($NO_2$). The exhaust system 113 includes a treatment system 114 that reduces the respective amounts of NOx and PM in the exhaust gas.

The treatment system 114 includes an oxidation catalyst (OC) 116, a dosing agent injector 118, and a selective catalytic reduction (SCR) catalyst 120. The exhaust system 113 may include an exhaust gas recirculation (EGR) system 122 that transfers exhaust gas from the exhaust system 113 to the intake manifold 104. The EGR system 122 includes an EGR line 124 in fluid communication with the exhaust system 113 and the intake manifold 104. An EGR valve 126 controls the amount of exhaust gas transferred to the intake manifold 104.

Exhaust gas exits the engine 102 from an exhaust manifold 128 and flows to the OC 116. The OC 116 removes hydrocarbons and/or carbon oxides from the exhaust gas. The dosing agent injector 118 injects a dosing agent into the exhaust gas stream, upstream of the SCR catalyst 120. The dosing agent may form ammonia ($NH_3$) when injected into the exhaust gas stream. The SCR catalyst 120 stores (i.e., adsorbs) $NH_3$ supplied by the dosing agent. For example only, the SCR catalyst 120 may include a vanadium catalyst and/or a zeolite catalyst. The SCR catalyst 120 may be implemented with a particulate filter (PF) or in another suitable configuration. The SCR catalyst 120 catalyzes a reaction between the stored $NH_3$ and NOx passing through the SCR catalyst 120. The amount of $NH_3$ stored by the SCR catalyst 120 is referred to as an $NH_3$ storage level.

The treatment system 114 may include a first NOx sensor 142 and a second NOx sensor 144. The NOx sensors 142 and 144 generate NOx signals that indicate amounts of NOx in the exhaust gas. The first NOx sensor 142 may be located upstream of the OC 116. In other implementations, the first NOx sensor 142 is located between the OC 116 and the SCR catalyst 120. The first NOx sensor 142 may be located downstream from the OC 116 and upstream from the dosing agent injector 118. The first NOx sensor 142 may indicate an amount of NOx entering the SCR catalyst 120. The signal generated by the first NOx sensor 142 may be called a $NOx_{IN}$ signal. The second NOx sensor 144 is located downstream of the SCR catalyst 120 and may indicate an amount of NOx exiting the SCR catalyst 120. The signal generated by the second NOx sensor 144 may be called a $NOx_{OUT}$ signal.

The percentage of NOx that is removed from the exhaust gas via the NOx and $NH_3$ reaction is referred to as conversion efficiency of the SCR catalyst 120. The conversion efficiency may be determined according to the equation:

$$\text{Efficiency}_{SCR} = \frac{NOx_{IN} - NOx_{OUT}}{NOx_{IN}} \quad (1)$$

where $\text{Efficiency}_{SCR}$ is the conversion efficiency of the SCR catalyst 120 and $NOx_{IN}$ and $NOx_{OUT}$ represent the amount of NOx indicated by the $NOx_{IN}$ and $NOx_{OUT}$ signals, respectively.

The conversion efficiency may be related to the $NH_3$ storage level. For example only, the conversion efficiency increases as the $NH_3$ storage level increases. Maintaining the $NH_3$ storage level of the SCR catalyst 120 at or near a maximum $NH_3$ storage level ensures that a maximum amount of NOx is removed from the exhaust gas. However, maintaining the $NH_3$ storage level at or near the maximum $NH_3$ storage level also increases the possibility of $NH_3$ slip.

$NH_3$ slip may occur when the SCR temperature increases at times when the $NH_3$ storage level is at or near the maximum $NH_3$ storage level. In other words, an increase in the SCR temperature causes a decrease in the maximum $NH_3$ storage level, and $NH_3$ stored in excess of this decreased maximum $NH_3$ storage level is desorbed. $NH_3$ slip may also occur due to an error (e.g., storage level estimation error) or faulty component (e.g., faulty dosing injector) in the engine system 100. Because the NOx sensors 142 and 144 are cross sensitive to $NH_3$, the $NOx_{OUT}$ signal may indicate NOx amounts and/or $NH_3$ amounts exiting the SCR catalyst 120.

Temperature sensors 146, 148, and 150 are located in various places throughout the exhaust system 113. For example only, the temperature sensor 146 is located upstream of the OC 116, the temperature sensor 148 is located downstream of the OC 116 and upstream of the SCR catalyst 120, and the temperature sensor 150 is located downstream of the SCR catalyst 120. The temperature sensors 146, 148, and 150 each measure temperature of the exhaust gas at their respective locations and output a signal that corresponds to that measured temperature. The signals output by the temperature sensors 146, 148, and 150 are referred to as $T_A$, $T_B$, and $T_C$, respectively.

An engine control module (ECM) 160 controls the torque output of the engine 102 based on the NOx signals, the temperature signals, and signals from other sensors 154. For example only, the other sensors 154 may include a manifold absolute pressure (MAP) sensor, a mass airflow (MAF) sensor, a throttle position sensor (TPS), an intake air temperature (IAT) sensor, and/or other sensor(s).

The ECM 160 controls the mass flow rate of dosing agent injected by the dosing agent injector 118 to regulate the $NH_3$ storage level of the SCR catalyst 120. The mass flow rate of dosing agent supplied may be referred to as $DA_{IN}$ (g/s), and the rate at which $NH_3$ is supplied to the SCR catalyst 120 is referred to as the $NH_3$ supply rate. The ECM 160 controls $DA_{IN}$ to maximize the conversion efficiency and minimize $NH_3$ slip by maintaining the $NH_3$ storage level at a set point. The ECM 160 may implement the slip detection system of the present disclosure to determine when $NH_3$ slip occurs.

Figure 2:
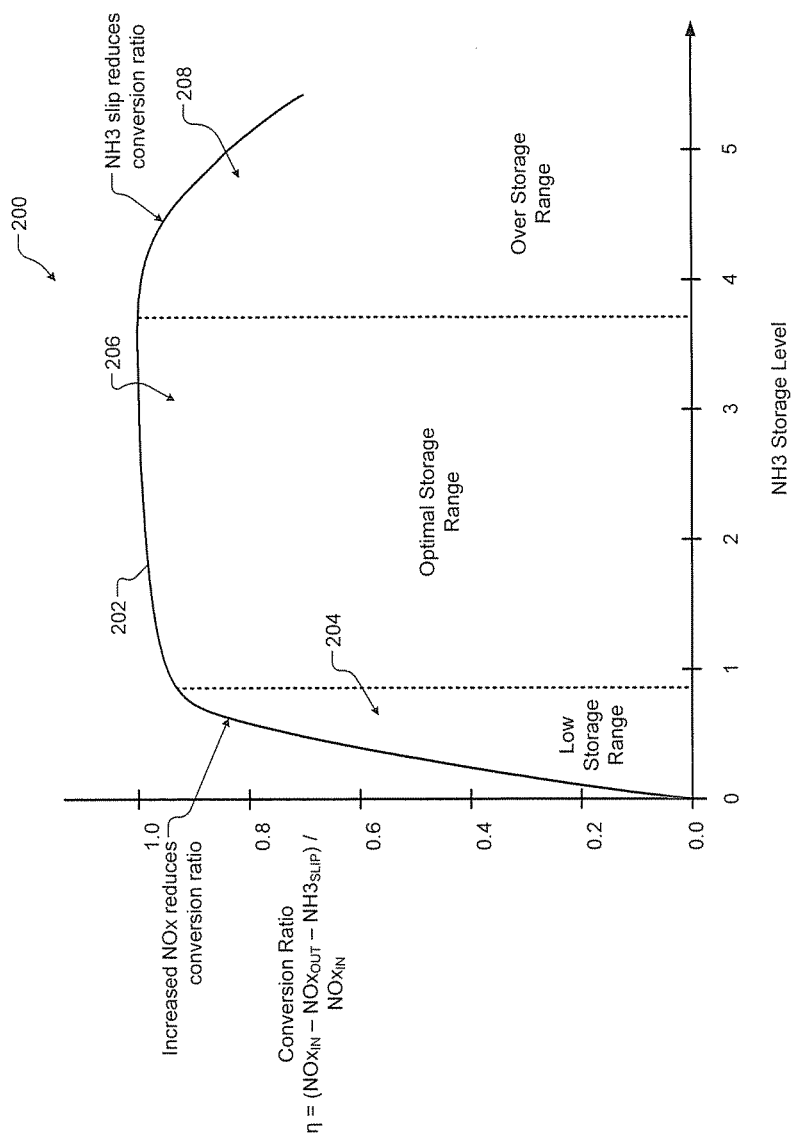
FIG. 2 is a graph that illustrates a selective catalytic reduction (SCR) system conversion ratio according to the present disclosure.

Referring now to FIG. 2, a graph 200 illustrates an exemplary relationship between a conversion ratio (η) and $NH_3$ storage levels of the SCR catalyst 120. The conversion ratio represented by plot 202 may be based on the $NOx_{IN}$ signal and the $NOx_{OUT}$ signal. For example, the conversion ratio may be expressed as:

$$\eta = \frac{NOx_{IN} - NOx_{OUT} - NH3_{SLIP}}{NOx_{IN}} \quad (2)$$

where $NH_{3,SLIP}$ represents a component of the $NOx_{OUT}$ signal indicating an amount of $NH_3$ slip. Accordingly, the detection of $NH_3$ by the second NOx sensor 144 may decrease the conversion ratio. The $NH_3$ storage level may be divided into three storage ranges: a low storage range 204, an optimal storage range 206, and an over storage range 208.

The conversion ratio may represent the conversion efficiency and/or an amount of $NH_3$ slip depending on the $NH_3$ storage level. The conversion ratio may represent the conversion efficiency of the SCR catalyst 120 when the $NH_3$ storage level is in the low storage range 204 and the optimal storage range 206. For example only, the conversion efficiency may be low (e.g., near zero) when the $NH_3$ storage level is low (e.g., near zero). The conversion efficiency, and accordingly the conversion ratio, of the SCR catalyst 120 may increase to a maximum of 1 as the $NH_3$ storage level increases towards the over storage range 208.

$NH_3$ slip generally does not occur in the low storage range 204 and the optimal storage range 206 because the injected $NH_3$ is adsorbed by the SCR catalyst 120 and/or reacts with NOx. Therefore, the $NOx_{OUT}$ signal primarily indicates NOx in the exhaust gas and little or no $NH_3$. As the $NH_3$ storage level increases from the low storage range 204 to the optimal storage range 206, the $NOx_{OUT}$ signal decreases relative to the $NOx_{IN}$ signal, resulting in a higher conversion ratio (i.e., the conversion efficiency increases).

When the $NH_3$ storage level increases into the over storage range 208, the conversion ratio may represent the amount of $NH_3$ slip. For example only, the $NOx_{OUT}$ signal may increase in magnitude due to the detection of both $NH_3$ and NOx while the magnitude of the $NOx_{IN}$ signal only indicates NOx. Accordingly, the increase in the magnitude of the $NOx_{OUT}$ signal may result in a decrease of the conversion ratio when the $NH_3$ storage level is in the over storage range 208.

The $NOx_{IN}$ amount may vary at a rate. The rate of variation of the $NOx_{IN}$ amount may depend on a rate of change in operating conditions of the engine system 100, such as engine speed, airflow, and/or EGR amounts.

During transient conditions, such as city driving, the $NOx_{IN}$ amount may vary at a higher rate than during steady conditions, such as highway driving. The $NOx_{OUT}$ amount may also vary at a rate. The rate of variation of the $NOx_{OUT}$ amount may depend on the rate of variation of the $NOx_{IN}$ amount and the $NH_3$ storage level. The $NH_3$ amount may vary at a lower rate than the rate of variation of the $NOx_{IN}$ and $NOx_{OUT}$ amounts during transient conditions. The $NOx_{IN}$ signal may include frequency components due to the rates of variation in the $NOx_{IN}$ amount. The $NOx_{OUT}$ signal may include frequency components due to the rates of variation of the $NOx_{OUT}$ amount and the $NH_3$ amount.

Figure 3:
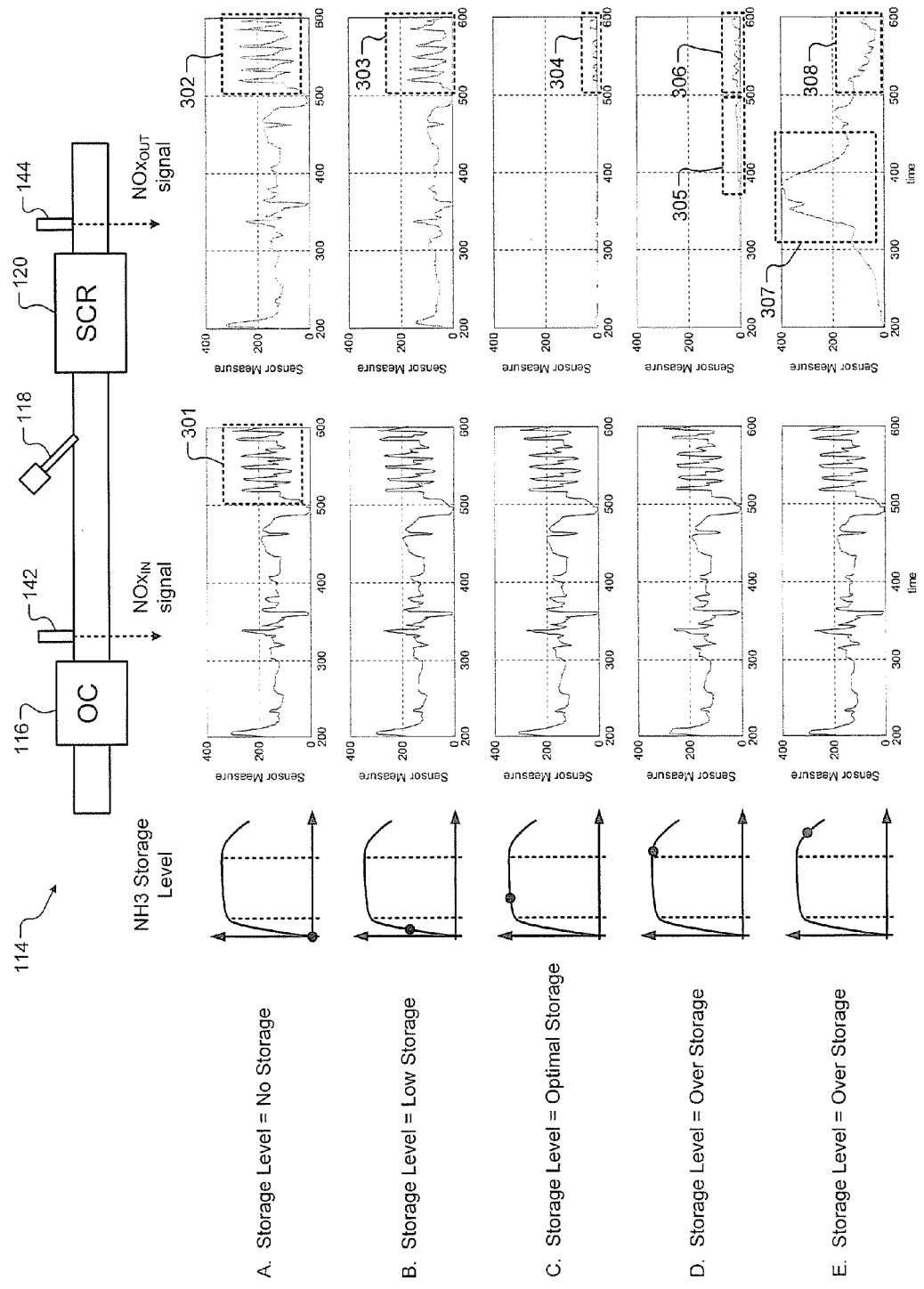
FIG. 3 illustrates signals that indicate amounts of nitrogen oxides (NOx) and ammonia (NH3) upstream from and downstream from an SCR catalyst.

Referring now to FIG. 3, experimental data sets A-E illustrate $NOx_{IN}$ and $NOx_{OUT}$ signals for various $NH_3$ storage levels during a sampling period (e.g. a 400-second sampling period from 200-600 seconds). The NOx signals may include multiple frequency components due to the variation of the NOx amounts and $NH_3$ amount during transient conditions. For example, the NOx signals may include low frequency components and high frequency components. NOx amounts may be indicated by the magnitudes of the low and high frequency components of the $NOx_{IN}$ and $NOx_{OUT}$ signals. $NH_3$ amounts may be indicated by the magnitude of low frequency components of the $NOx_{OUT}$ signal.

In data set A, little or no $NH_3$ is stored in the SCR catalyst 120, so no $NH_3$ slips. Therefore, the $NOx_{IN}$ signal and the $NOx_{OUT}$ signal include similar frequency components at similar times throughout the sampling period. For example, the $NOx_{IN}$ signal includes a high frequency component as illustrated at 301 from approximately 500-600 seconds. The $NOx_{OUT}$ signal also includes a high frequency component as illustrated at 302 from approximately 500-600 seconds. The magnitudes of the $NOx_{IN}$ signal and the $NOx_{OUT}$ signal are also similar at similar times throughout the sampling period due to a low conversion efficiency of the SCR catalyst 120.

In data set B, the $NH_3$ storage level of the SCR catalyst 120 increases, but no $NH_3$ slips. The NOx conversion efficiency increases. Therefore, the $NOx_{OUT}$ signal continues to include similar frequency components at similar times throughout the sampling period, including a high frequency component illustrated at 303. However, the magnitude of the $NOx_{OUT}$ signal, including the high frequency component, is attenuated due to an increased conversion efficiency of the SCR catalyst 120.

In data set C, the $NH_3$ storage level of the SCR catalyst 120 is within the optimal storage range, and no $NH_3$ slips. The NOx conversion efficiency increases to an optimal conversion efficiency. The $NOx_{OUT}$ signal may no longer include similar frequency components at similar times throughout the sampling period since the magnitude of the $NOx_{OUT}$ signal is reduced to almost 0 during most of the sampling period. The magnitude of the high frequency component as illustrated at 304 is further attenuated.

In data set D, the $NH_3$ storage level of the SCR catalyst 120 enters the over storage range, and $NH_3$ begins to slip, for example at approximately 375 seconds. The NOx conversion efficiency may remain at the optimal conversion efficiency. However, the magnitude of the $NOx_{OUT}$ signal begins to increase due to the $NH_3$ slip. The $NOx_{OUT}$ signal includes a low frequency component with a magnitude that indicates the $NH_3$ slip amount as illustrated at 305. The $NOx_{OUT}$ signal also continues to include a high frequency component with a magnitude that indicates a NOx amount as illustrated at 306.

In data set E, the $NH_3$ storage level of the SCR catalyst 120 increases further into the over storage range, and more $NH_3$ slips. The $NH_3$ slip amount increases from approximately 200-375 seconds. The $NOx_{OUT}$ signal includes a low frequency component with a magnitude that indicates the $NH_3$ slip amount as illustrated at 307. The $NOx_{OUT}$ signal also continues to include a high frequency component with a magnitude that indicates a NOx amount as illustrated at 308.

Figure 4A:
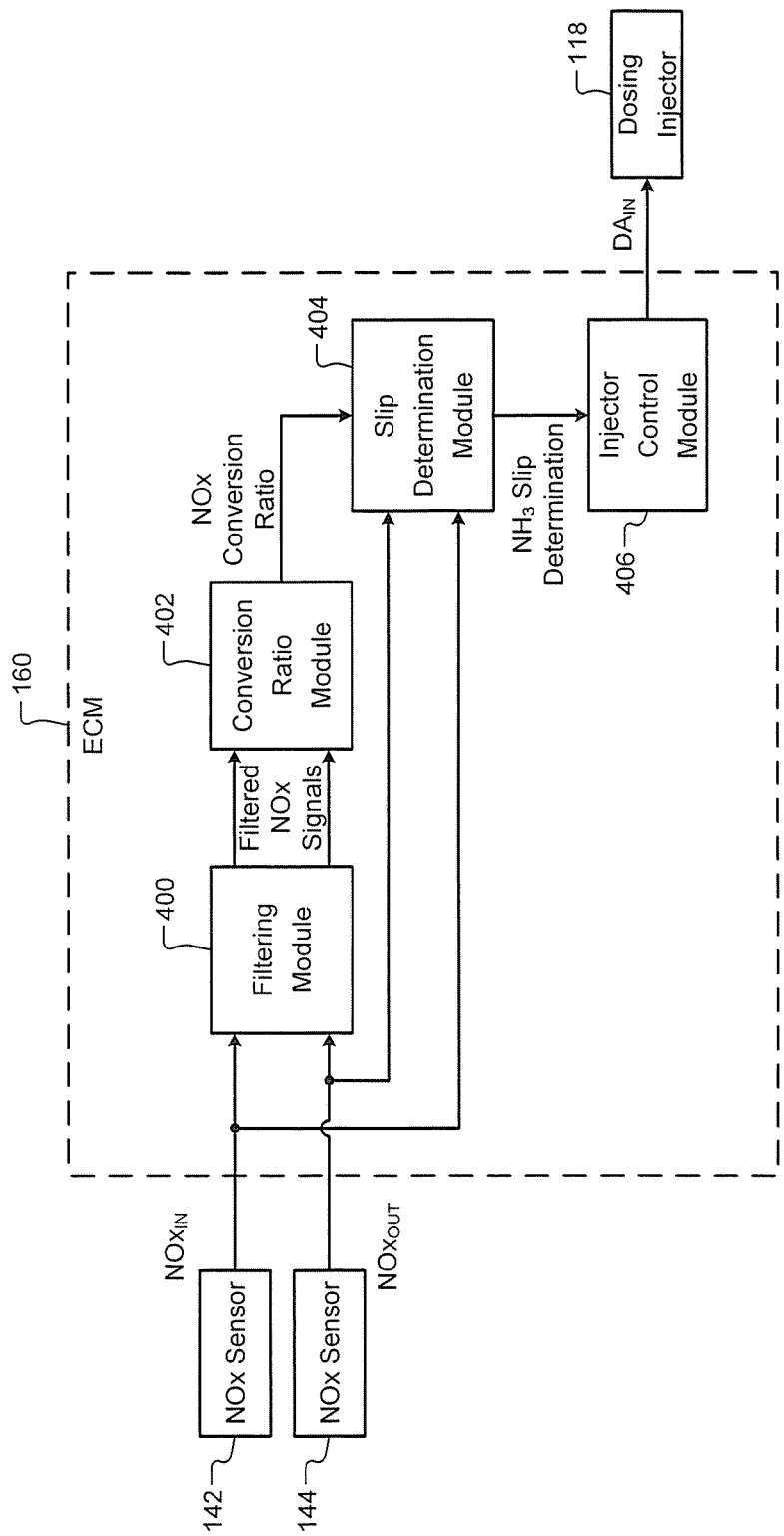
FIG. 4A is a functional block diagram of an engine control module according to the present disclosure.

Referring now to FIG. 4A, the ECM 160 includes a filtering module 400, a conversion ratio module 402, a slip determination module 404, and an injector control module 406. The ECM 160 receives input signals from the engine system 100. The input signals include, but are not limited to, signals generated by the NOx sensors 142 and 144, the temperature sensors 146-150, and the other sensors 154. The ECM 160 processes the input signals and generates timed engine control commands that are output to the engine system 100. The engine control commands may actuate the ETC 108, the fuel injector 110, the dosing agent injector 118, and the EGR valve 126. The ECM 160 may implement the slip detection system during transient conditions.

The filtering module 400 filters frequency components of the $NOx_{IN}$ and $NOx_{OUT}$ signals. The conversion ratio module 402 determines a NOx conversion ratio based on the filtered NOx signals. The slip determination module 404 determines an estimated magnitude of the $NOx_{OUT}$ signal based on the NOx conversion ratio and the magnitude of the $NOx_{IN}$ signal. The slip determination module 404 determines whether $NH_3$ slip is occurring based on a difference between the estimated magnitude and the magnitude of the $NOx_{OUT}$ signal. The injector control module 406 may adjust $DA_{IN}$ when $NH_3$ slip is occurring.

The filtering module 400 filters the $NOx_{IN}$ and $NOx_{OUT}$ signals. For example, the filtering module 400 may filter the NOx signals based on a frequency threshold. The frequency threshold may correspond to the high frequency component of the NOx signals. For example only, the frequency threshold may be 0.1 Hz. The filtering module 400 may pass the high frequency components and block the low frequency components of the NOx signals. The filtering module 400 may apply a high pass filter to the NOx signals that removes the low frequency components of the NOx signals that are less than or equal to the frequency threshold. The filtering module 400 may attenuate the magnitude of the low frequency components of the NOx signals that are less than or equal to the frequency threshold.

The conversion ratio module 402 determines the NOx conversion ratio ($r_{NOx}$) based on the filtered $NOx_{IN}$ and $NOx_{OUT}$ signals. That is, the conversion ratio may be based on the magnitudes of the high frequency components of the NOx signals. For example only, the conversion ratio module 402 may determine a ratio of the magnitudes of the filtered $NOx_{IN}$ signal and the filtered $NOx_{OUT}$ signal. The ratio may be expressed as:

$$r_{NOx} = \frac{\text{filtered\_NOx}_{OUT}}{\text{fitlered\_NOx}_{IN}} \quad (3)$$

where filtered_$NOx_{IN}$ and filtered $NOx_{OUT}$ are magnitudes of the filtered $NOx_{IN}$ and $NOx_{OUT}$ signals, respectively.

The slip determination module 404 determines whether $NH_3$ is occurring based on the NOx conversion ratio and the magnitudes of the unfiltered $NOx_{IN}$ and $NOx_{OUT}$ signals. For example only, the slip determination module 404 may determine an estimated magnitude of the $NOx_{OUT}$ signal ($NOx_{OUT,EST}$) based on the NOx conversion ratio and the magnitude of the $NOx_{IN}$ signal ($NOx_{IN,SIG}$). The estimated magnitude of the $NOx_{OUT}$ signal may be determined according to the equation:

$$NOx_{OUT,EST} = r_{NOx} \times NOx_{IN,SIG} \quad (4)$$

The slip determination module 404 may compare $NOx_{OUT,EST}$ and the magnitude of the $NOx_{OUT}$ signal ($NOx_{OUT,SIG}$) to determine when $NH_3$ slip is occurring. For example only, the slip determination module 404 may determine slip is occurring when a difference between $NOx_{OUT,SIG}$ and $NOx_{OUT,EST}$ is greater than a NOx threshold.

Figure 5A:
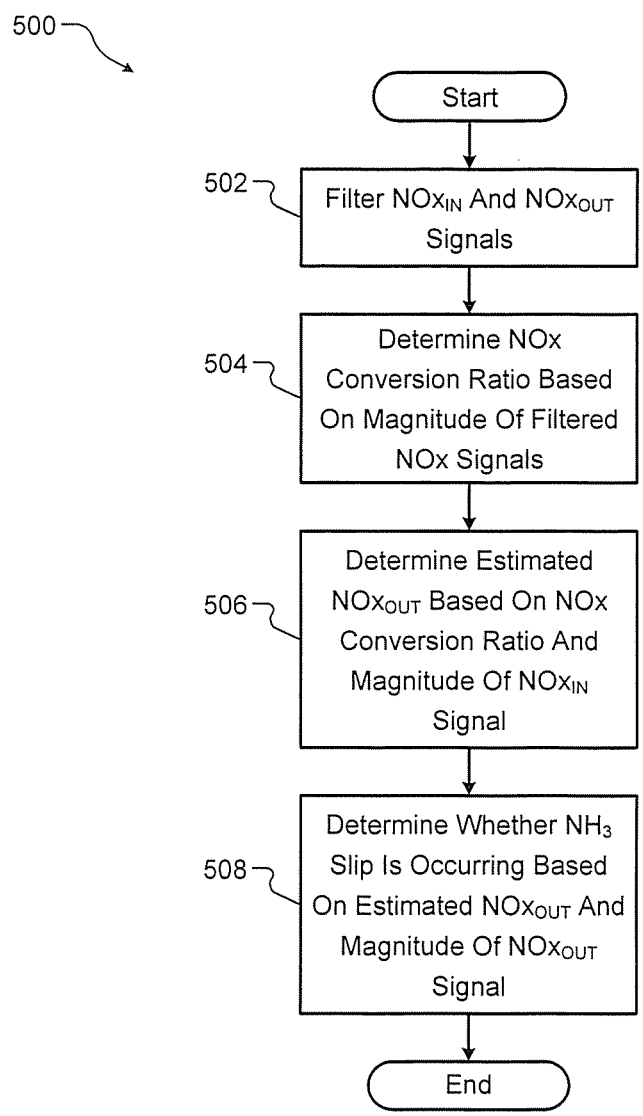
FIG. 5A is a flowchart that illustrates a method performed by the engine control module of FIG. 4A according to the present disclosure.

Referring now to FIG. 5A, a flowchart 500 depicts steps of an exemplary method performed by the ECM 160. In step 502, control filters the $NOx_{IN}$ and $NOx_{OUT}$ signals. For example only, control may apply one or more filters to the $NOx_{IN}$ and $NOx_{OUT}$ signals to remove low frequency components that are less than the frequency threshold and pass high frequency components that are greater than the frequency threshold. In step 504, control determines the NOx conversion ratio based on the magnitudes of the filtered NOx signals. In step 506, control determines the estimated magnitude of the $NOx_{OUT}$ signal based on the NOx conversion ratio and the magnitude of the $NOx_{IN}$ signal. In step 508, control determines whether $NH_3$ slip is occurring based on a comparison of the estimated magnitude and the magnitude of the $NOx_{OUT}$ signal.

During steady conditions, such as highway driving, the $NOx_{IN}$ amount may vary at a lower rate than during transient conditions, such as city driving. The $NOx_{IN}$ signal may include only low frequency components during steady conditions due to a lower rate of variation of the $NOx_{IN}$ amount. The $NOx_{OUT}$ amount and the $NH_3$ amount may also vary at lower rates. The $NOx_{OUT}$ signal may include only low frequency components due to the lower rates of variation of the $NOx_{OUT}$ amount and the $NH_3$ amount.

During steady conditions, the ECM 160 may induce the $NOx_{IN}$ signal to include a high frequency component by dithering actuators of the engine system 100. For example only, the ECM 160 may apply a sinusoidal control signal to the ETC 108 and/or the EGR valve 126. Fluctuations in the position of the ETC 108 and/or the EGR valve 126 may cause the $NOx_{IN}$ amount to fluctuate. The fluctuations in the $NOx_{IN}$ amount may be reflected in a high frequency component of the $NOx_{IN}$ signal. Therefore, the ECM 160 may implement the slip detection system during steady conditions. However, the frequency filtering performed by the ECM 160 may be less effective during steady conditions than during transient conditions.

Figure 4B:
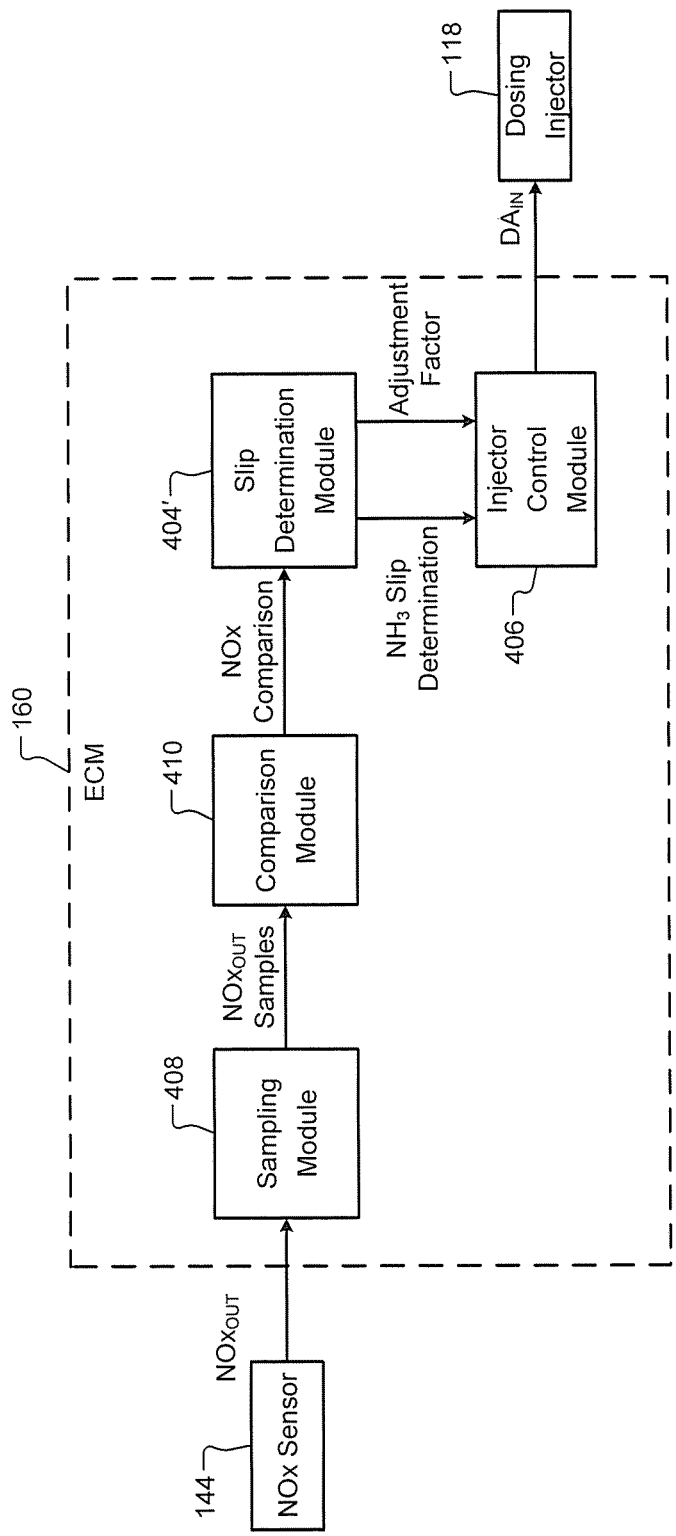
FIG. 4B is a functional block diagram of another engine control module according to the present disclosure.

Referring now to FIG. 4B, the ECM 160 includes a sampling module 408, a comparison module 410, another slip determination module 404', and the injector control module 406. The ECM 160 receives input signals from the engine system 100. The input signals include, but are not limited to, signals generated by the NOx sensors 142 and 144, the temperature sensors 146-150, and the other sensors 154. The ECM 160 processes the input signals and generates timed engine control commands that are output to the engine system 100. The engine control commands may actuate the ETC 108, the fuel injector 110, the dosing agent injector 118, and the EGR valve 126. The ECM 160 may implement slip detection system during steady conditions.

The injector control module 406 controls the mass flow rate ($DA_{IN}$) of the dosing agent injector 118. The sampling module 408 receives the $NOx_{OUT}$ signal from the second NOx sensor 144 and samples the $NOx_{OUT}$ signal at various times during a sampling period. The comparison module 410 compares the samples at different times to determine whether the magnitude of the $NOx_{OUT}$ signal increases or decreases. The slip determination module 404' monitors changes in the magnitude of the $NOx_{OUT}$ signal when $DA_{IN}$ is adjusted. The slip determination module 404' determines when $NH_3$ slip is occurring based on the adjustment to $DA_{IN}$ and the change in the magnitude of the $NOx_{OUT}$ signal.

The injector control module 406 may control $DA_{IN}$ to a first $DA_{IN}$ at a first time during the sampling period to maintain an $NH_3$ storage level. The slip determination module 404' may generate an adjustment factor to adjust $DA_{IN}$. The injector control module 406 may adjust $DA_{IN}$ based on the adjustment factor. The injector control module 406 may increase or decrease $DA_{IN}$ based on the adjustment factor from the first $DA_{IN}$ to a second $DA_{IN}$ at a second time. The sampling module 408 may sample the $NOx_{OUT}$ signal at the second time.

The injector control module 406 maintains $DA_{IN}$ at the second $DA_{IN}$ until a third time. Between the second and third times, the $NH_3$ storage level of the SCR catalyst 120 may increase or decrease depending on the adjustment factor. For example only, when the adjustment factor decreases $DA_{IN}$, the $NH_3$ storage level may decrease. The sampling module 408 may sample the $NOx_{OUT}$ signal at the third time.

The comparison module 410 compares the samples of the $NOx_{OUT}$ signal during the sampling period. The comparison module 410 may compare the samples to determine whether an increase or a decrease in magnitude of the $NOx_{OUT}$ signal occurs between the second and third times. The comparison module 410 may compare the samples to determine a rate of change in the magnitude.

The slip determination module 404' determines whether $NH_3$ slip is occurring based on the adjustment of $DA_{IN}$ from the first time to the second time and the comparison of the $NOx_{OUT}$ samples at the second and third times. Because the $NOx_{OUT}$ signal indicates both NOx amounts and $NH_3$ amounts in the exhaust gas exiting the SCR catalyst 120, the slip determination module 404' determines whether $NH_3$ slip is occurring by adjusting the $NH_3$ storage level and monitoring the response of the $NOx_{OUT}$ signal.

For example only, the injector control module 406 may control $DA_{IN}$ to the first $DA_{IN}$ at the first time during the sampling period. The slip determination module 404' may generate an adjustment factor that decreases $DA_{IN}$ to a second $DA_{IN}$ that is less than the first $DA_{IN}$. For example only, the second $DA_{IN}$ may be 0 g/s at the second time. The sampling module 408 samples the $NOx_{OUT}$ signal at the second time. The injector control module 406 may maintain $DA_{IN}$ at 0 g/s during the sampling period. The sampling module 408 samples the $NOx_{OUT}$ signal at the third time.

When $DA_{IN}$ is reduced to 0 g/s during the sampling period, $NH_3$ is no longer added to the SCR catalyst 120. The $NH_3$ storage level decreases because NOx entering the SCR catalyst 120 reacts with the stored $NH_3$. As the $NH_3$ storage level decreases, the $NOx_{OUT}$ signal may increase or decrease depending on the $NH_3$ storage level.

When the $NH_3$ storage level is in the optimal storage range or the low storage range, a decrease in the $NH_3$ storage level reduces the conversion efficiency of the SCR catalyst 120. That is, less $NH_3$ is available to react with the NOx. Therefore, the $NOx_{OUT}$ signal may increase as the $NH_3$ storage level decreases due to an increase in the $NOx_{OUT}$ amount. However, when the $NH_3$ storage level is in the over storage range 208, a decrease in the $NH_3$ storage level reduces $NH_3$ slip. That is, less $NH_3$ exits the SCR catalyst 120. Therefore, the $NOx_{OUT}$ signal may decrease as the $NH_3$ storage level decreases due to a decrease in the $NH_3$ amount.

The slip determination module 404' determines whether $NH_3$ slip occurs based on the comparison of the $NOx_{OUT}$ samples and the adjustment of $DA_{IN}$. When $DA_{IN}$ decreases between the first and second times and the $NOx_{OUT}$ signal decreases by more than a predetermined amount between the second and third times, the slip determination module 404' may determine that $NH_3$ is occurring. When $DA_{IN}$ decreases between the first and second times and the $NOx_{OUT}$ signal increases by more than a predetermined amount between the second and third times, the slip determination module 404' may determine that $NH_3$ slip is not occurring.

Although the adjustment of $DA_{IN}$ described above includes reducing $DA_{IN}$ from the first $DA_{IN}$ to the second $DA_{IN}$, such as reducing $DA_{IN}$ to 0 g/s, the adjustment of $DA_{IN}$ may include increasing $DA_{IN}$ to elicit an opposite response from the $NOx_{OUT}$ signal. That is, when $DA_{IN}$ increases between the first and second times and the $NOx_{OUT}$ signal increases between the second and third times, the slip determination module 404' may determine that $NH_3$ slip is occurring. When $DA_{IN}$ increases between the first and second times and the $NOx_{OUT}$ signal does not increase between the second time and third times, the slip determination module 404' may determine that $NH_3$ slip is not occurring.

Figure 5B:
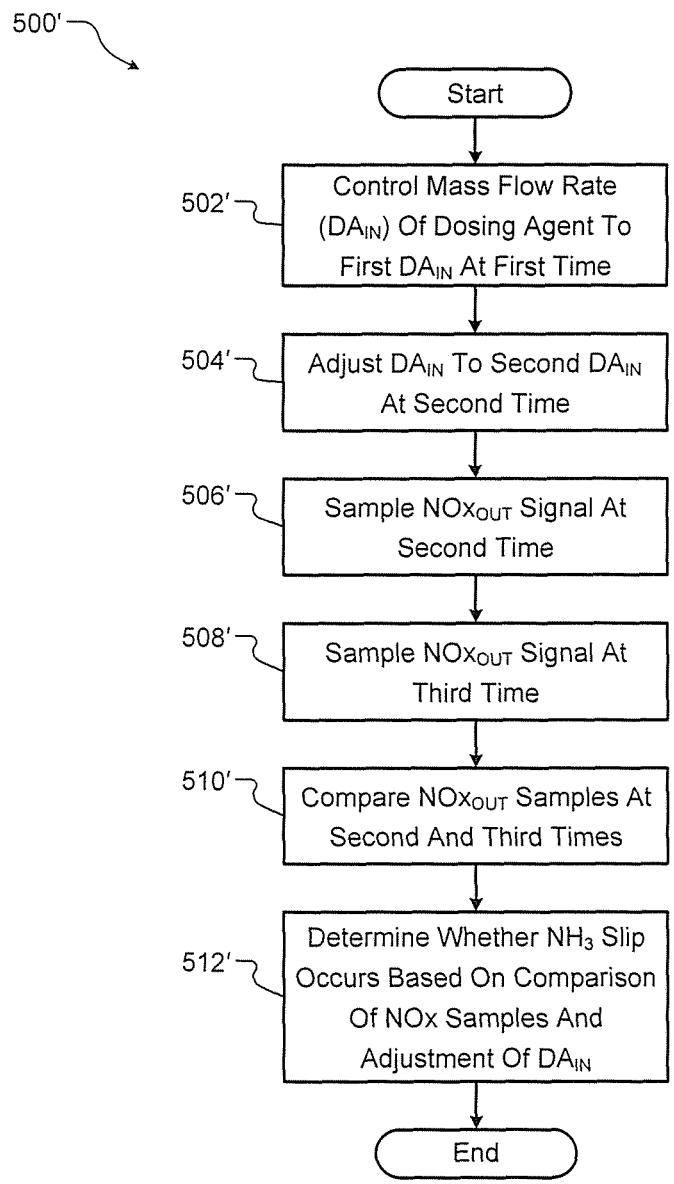
FIG. 5B is a flowchart that illustrates a method performed by the engine control module of FIG. 4B according to the present disclosure.

Referring now to FIG. 5B, a flowchart 500' depicts steps of an exemplary method performed by the ECM 160. In step 502', control delivers the dosing agent at a first mass flow rate ($DA_{IN}$) at a first time during the sampling period. In step 504', control adjusts $DA_{IN}$ to a second $DA_{IN}$ at a second time during the sampling period. For example only, control may decrease or increase the mass flow rate from the first $DA_{IN}$ to the second $DA_{IN}$ at the second time. In step 506', control samples the $NOx_{OUT}$ signal at the second time. Control may maintain the mass flow rate at the second $DA_{IN}$ during the sampling period.

In step 508', control samples the $NOx_{OUT}$ signal at a third time during the sampling period. In step 510', control compares the samples of the $NOx_{OUT}$ signal at the second and third times. Control may determine whether an increase or decrease in magnitude of the $NOx_{OUT}$ signal occurs from the second time to the third time. In step 512', control determines whether $NH_3$ slip occurs based the comparison of the $NOx_{OUT}$ samples and the adjustment of $DA_{IN}$.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
a filtering module that filters a first signal that indicates an amount of nitrogen oxides (NOx) in exhaust gas upstream from a catalyst, and that filters a second signal that indicates amounts of NOx and ammonia ($NH_3$) in exhaust gas downstream from the catalyst; and
a slip determination module that determines whether $NH_3$ is present in exhaust gas downstream from the catalyst based on a frequency response of the first and second signals.

2. The system of claim 1, wherein the filtering module passes first frequency components of the signals that indicate only NOx and attenuates second and third frequency components of the signals that indicate NOx and $NH_3$.

3. The system of claim 2, wherein the first frequency components include frequencies that are greater than a frequency threshold and the second and third frequency components include frequencies that are less than or equal to the frequency threshold.

4. The system of claim 2, further comprising a conversion ratio module that determines a NOx conversion ratio of the catalyst based on the first frequency components.

5. The system of claim 4, wherein the slip determination module determines an estimated magnitude of the second signal based on a magnitude of the first signal and the NOx conversion ratio.

6. The system of claim 5, wherein the slip determination module determines $NH_3$ is present when a difference between the estimated magnitude and a magnitude of the second signal is greater than a threshold.

7. A system comprising:
an injector control module that adjusts a flow rate of a dosing agent, wherein the adjusted flow rate controls an amount of ammonia ($NH_3$) in exhaust gas upstream from a catalyst;
a comparison module that compares first and second samples of a signal based on the adjusted flow rate, wherein the signal indicates an amount of nitrogen oxides (NOx) and an amount of $NH_3$ in exhaust gas downstream from the catalyst; and
a slip determination module that determines whether $NH_3$ is present in the exhaust gas downstream from the catalyst based on the adjusted flow rate and the comparison,
wherein the slip determination module determines whether a slip in the amount of $NH_3$ in the exhaust gas has occurred based on whether the signal indicates a change in the amount of NOx by more than a predetermined amount.

8. The system of claim 7, further comprising a sampling module that samples the first sample when the injector control module adjusts the flow rate and that samples the second sample at a predetermined time after the first sample.

9. The system of claim 7, wherein the slip determination module determines:
$NH_3$ is present when the adjusted flow rate decreases the amount of $NH_3$ and the second sample is less than the first sample; and
$NH_3$ is present when the adjusted flow rate increases the amount of $NH_3$ and the second sample is greater than the first sample.

10. The system of claim 7, wherein the slip determination module:
determines a slip in the amount of $NH_3$ in the exhaust gas has occurred when the signal indicates a decrease in the amount of NOx by more than a first predetermined amount; and
determines a slip in the amount of $NH_3$ in the exhaust gas has not occurred when the signal indicates an increase in the amount of NOx by more than a second predetermined amount.

11. A method comprising:
filtering a first signal that indicates an amount of nitrogen oxides (NOx) in exhaust gas upstream from a catalyst;
filtering a second signal that indicates amounts of NOx and ammonia ($NH_3$) in exhaust gas downstream from the catalyst; and
determining whether $NH_3$ is present in exhaust gas downstream from the catalyst based on a frequency response of the first and second signals.

12. The method of claim 11, further comprising:
passing first frequency components of the signals that indicate only NOx; and
attenuating second and third frequency components of the signals that indicate NOx and $NH_3$.

13. The method of claim 12, wherein the first frequency components include frequencies that are greater than a frequency threshold and the second and third frequency components include frequencies that are less than or equal to the frequency threshold.

14. The method of claim 12, further comprising determining a NOx conversion ratio of the catalyst based on the first frequency components.

15. The method of claim 14, further comprising determining an estimated magnitude of the second signal based on a magnitude of the first signal and the NOx conversion ratio.

16. The method of claim 15, further comprising determining $NH_3$ is present when a difference between the estimated magnitude and a magnitude of the second signal is greater than a threshold.

17. A method comprising:
adjusting a flow rate of a dosing agent, wherein the adjusted flow rate controls an amount of ammonia ($NH_3$) in exhaust gas upstream from a catalyst;
comparing first and second samples of a signal based on the adjusted flow rate, wherein the signal indicates an amount of nitrogen oxides (NOx) and an amount of $NH_3$ in exhaust gas downstream from the catalyst;
determining whether $NH_3$ is present in the exhaust gas downstream from the catalyst based on the adjusted flow rate and the comparison; and
determining whether a slip in the amount of $NH_3$ in the exhaust gas has occurred based on whether the signal indicates a change in the amount of NOx by more than a predetermined amount.

18. The method of claim 17, further comprising:
sampling the first sample when the flow rate is adjusted; and
sampling the second sample at a predetermined time after the first sample.

19. The method of claim 17, further comprising;
determining $NH_3$ is present when the adjusted flow rate decreases the amount of $NH_3$ and the second sample is less than the first sample; and
determining $NH_3$ is present when the adjusted flow rate increases the amount of $NH_3$ and the second sample is greater than the first sample.

20. The method of claim 18, further comprising:
    determining a slip in the amount of $NH_3$ in the exhaust gas has occurred when the signal indicates a decrease in the amount of NOx by more than a first predetermined amount; and
    determining a slip in the amount of $NH_3$ in the exhaust gas has not occurred when the signal indicates an increase in the amount of NOx by more than a second predetermined amount.

* * * * *